United States Patent
Chang et al.

(10) Patent No.: US 8,339,452 B2
(45) Date of Patent: Dec. 25, 2012

(54) MONITOR SYSTEM FOR MONITORING RIVERBED ELEVATION CHANGE AT BRIDGE PIER

(75) Inventors: Wen-Yi Chang, Hsinchu (TW); Whey-Fone Tsai, Hsinchu (TW); Jihn-Sung Lai, Taipei (TW); Yu-Hui Liao, Hsinchu (TW); Ho-Cheng Lien, Hsinchu (TW); Lung-Cheng Lee, Hsinchu (TW); Franco Lin, Hsinchu (TW); Te-lin Chung, Hsinchu (TW); Jyh-Horng Wu, Hsinchu (TW); Yi-Haur Shiau, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 489 days.

(21) Appl. No.: 12/591,324

(22) Filed: Nov. 17, 2009

(65) Prior Publication Data

US 2011/0063434 A1    Mar. 17, 2011

(30) Foreign Application Priority Data

Sep. 16, 2009  (TW) ................................ 98131157 A

(51) Int. Cl.
*H04N 7/18* (2006.01)
*G06K 9/00* (2006.01)
(52) U.S. Cl. ..................... 348/135; 348/160; 382/106

(58) Field of Classification Search .................. 359/368; 73/493, 61.61, 594, 295; 175/45; 324/348; 367/88; 348/135, 160; 382/106
See application file for complete search history.

(56) References Cited

U.S. PATENT DOCUMENTS

| | | | |
|---|---|---|---|
| 6,680,795 B2 * | 1/2004 | Chezar et al. ................. | 359/368 |
| 7,832,274 B1 * | 11/2010 | Mercado ........................ | 73/594 |
| 2004/0027919 A1 * | 2/2004 | Erikson .......................... | 367/88 |
| 2006/0065441 A1 * | 3/2006 | Kuckes ......................... | 175/45 |
| 2007/0289380 A1 * | 12/2007 | Lin et al. ........................ | 73/493 |
| 2008/0042653 A1 * | 2/2008 | Bryant ......................... | 324/348 |
| 2008/0092656 A1 * | 4/2008 | Lopreiato ..................... | 73/594 |
| 2009/0145207 A1 * | 6/2009 | Bousmina et al. ........... | 73/61.61 |
| 2010/0206067 A1 * | 8/2010 | Cigada et al. .................. | 73/295 |

* cited by examiner

*Primary Examiner* — Jungwon Chang
(74) *Attorney, Agent, or Firm* — Rosenberg, Klein & Lee

(57) ABSTRACT

A monitor system for monitoring riverbed elevation changes at bridge piers is revealed. The monitor system includes a container, a rail, a holder, a photographic unit, a processor and a transmission unit. The container is disposed at a pier under the water and the rail is mounted in the container. The holder is arranged at the rail and is moved on the rail. The photographic unit is disposed on the holder to capture a monitor image of a riverbed under the water. As to the processor, it processes the monitor image so as to learn elevation change of the riverbed under the water. By the transmission unit, the riverbed elevation change is sent to a remote monitor unit so as to get the riverbed elevation according to the riverbed elevation change. Thus the riverbed elevation change at the bridge pier is monitored in real time.

28 Claims, 6 Drawing Sheets

MONITOR SYSTEM FOR MONITORING RIVERBED ELEVATION CHANGE AT BRIDGE PIER

BACKGROUND OF THE INVENTION

1. Fields of the Invention

The present invention relates to a monitor system for monitoring riverbed elevation changes at bridge piers, especially to a monitor system that processes monitor images to get the riverbed elevation changes at bridge piers and send the riverbed elevation changes to a remote monitor unit for a real-time monitoring.

2. Descriptions of Related Art

In recent years, natural disasters such as storms and associated flooding become more frequent and severe in countries all over the world. When the disaster comes, it causes serious flooding on the rivers and other streams so that the scour of the bridge foundations is becoming worse and this leads to exposure of bridge foundations. Thus the lateral support on the bridge pier is insufficient and the bridge may be tilted or broken. Once the flooding is too vast, the pier is washed away, the bridge collapses and people passing through the bridge may fall into the water. The above condition not only results in traffic interruption, but also great damages to human lives, common property and local construction. Now in order to observe the riverbed scour at bridge piers and make an alarm, a monitor system is developed. Thus the riverbed scour at bridge piers can be found as early as possible so as to assure the bridge safety and provide a precaution alarm. The traffic safety is ensured and the secondary damage caused by the broken bridge can be avoided. Moreover, the lifetime of the bridge is also extended by strengthening and repair taken in time. Furthermore, by long-term record of monitor data, a complete database of the bridge pier scour is established for pier protection and riverbed restoration in the future.

Among a lot of technologies that monitor the bridge pier scour, the most common methods are followings:

Ground Penetrating Radar: is a non-destructive method that uses electromagnetic radiation in the high frequency band of the radio spectrum, and detects the reflected signals from subsurface structures. Thus the elevation changes of the riverbed under the water are obtained. The advantage of this method is that the changes in the riverbed elevation can be recorded continuously yet the shortcoming is that the operation is time-consuming. Moreover, people need to take training classes for operation of the device.

Numbered Bricks: a brick array formed by bricks with fixed size and sequential numbers is mounted under the riverbed at the upstream around a bridge pier. When a flood comes, the riverbed elevation change is measured by the positions and numbers of the bricks swept away. The disadvantage of the method is that it requires to dig in the riverbed for mounting the brick array and each set of array can be used only once. Moreover, only the scour depth is learned while the sediment deposition is unable to detect.

Sliding Magnetic Collar: a slide bar with a hollow design is disposed on the surface of a bridge pier and a collar sleeve covers the slide bar. When the flood scours, the collar sleeve moves downward to provide the scour depth of a specific position. A magnetic sensor disposed in the slide bar moves along with the collar sleeve and sends movement signals to externals by wires. The disadvantage of this method is that it only records the scour depth but the sediment deposition is unable to detect.

The monitor methods available now all have certain limitations. Thus some other monitor systems have been developed. Refer to Taiwanese Pat. App. No. 91130327 and No. 93132366, an on-site monitor unit and a remote monitor unit are revealed. The on-site monitor unit includes a water tight tube that is set at the bridge pier under the water. An image capture device is disposed in the water tight tube so as to get images under the water and the images obtained are transmitted to the remote monitor unit for people to observe and learn the riverside elevation under the water. Thus the changes in the riverbed elevation are learned. Moreover, according to the riverbed elevation changes, people responsible for monitoring can send commands from the remote monitor unit to the on-site monitor unit so as to control the image capture device moving upward/downward and adjusting the image-capture positions. However, the monitor system transmits images with large data amount to the remote monitor unit for people to observe and check the riverbed elevation. The image transmission requires higher bandwidth consumption and the monitor system needs sufficient bandwidth. Besides, people got to monitor the images from the on-site monitor unit at all times so as to send commands for adjustment of the image capture device. This not only consumes labor and cost but also causes inconvenience in use.

Thus there is a need to develop a monitor system for monitoring riverbed elevation changes at bridge piers that overcomes above shortcomings. In the present invention, only the elevation changes of the riverbed are transmitted to a remote monitor unit so that the bandwidth consumption is reduced effectively. The problem of conventional monitor systems that requires higher bandwidth is solved. Moreover, the positions of the photographic unit are adjusted automatically by the monitor system of the present invention according to elevation changes of the riverbed. There is no need to operate the photographic unit by staffs responsible for monitoring. Thus the convenience in use is improved and the shortcomings of conventional techniques mentioned above have been overcome.

SUMMARY OF THE INVENTION

Therefore it is a primary object of the present invention to provide a monitor system for monitoring riverbed elevation changes at bridge piers in which monitor images are obtained by shooting the riverbed under the water and then are processed by a processor so as to get real-time riverbed elevation changes. The related data is sent to a remote monitor unit for real-time monitoring and records. Thus the amount of data transmitted is reduced and the bandwidth required is also decreased.

It is another object of the present invention to provide a monitor system for monitoring riverbed elevation changes at bridge piers in which shooting positions of a photographic unit are adjusted automatically by a holder moving along a rail while the holder is controlled and moved by a processor according to the riverbed elevation changes. Thus there is no need to manipulate the photographic unit manually. Therefore, the labor cost is saved effectively and the convenience of monitoring is improved.

In order to achieve above objects, a monitor system for monitoring riverbed elevation changes at bridge piers of the present invention includes a container disposed at a bridge pier, a rail with a holder moving therein mounted in the container, a photographic unit arranged at the holder for taking images of a riverbed under the water and obtaining a monitor image, a processor for analysis of the monitor image to learn elevation changes of the riverbed under the water, and a transmission unit coupled with the processor for sending the riverbed elevation changes to a remote monitor unit that monitors and records the riverbed elevation changes in real time. By using a processor that processes the monitor images shot by the photographic unit, the elevation changes of the riverbed under the water are obtained. Thus instead of monitor images, only the information related to the riverbed elevation changes is sent to the remote monitor unit. Therefore, the amount of data transmission is reduced dramatically and the bandwidth consumption is minimized effectively.

Furthermore, the processor of the present invention automatically controls the holder to move on the rail according to the riverbed elevation changes so as to adjust positions of the photographic unit that captures images of the riverbed under the water and obtains the monitor images. Due to automatic control of the processor, there is no need to operate the photographic unit by labors. Therefore, the labor cost is saved effectively and the convenience of monitoring is improved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
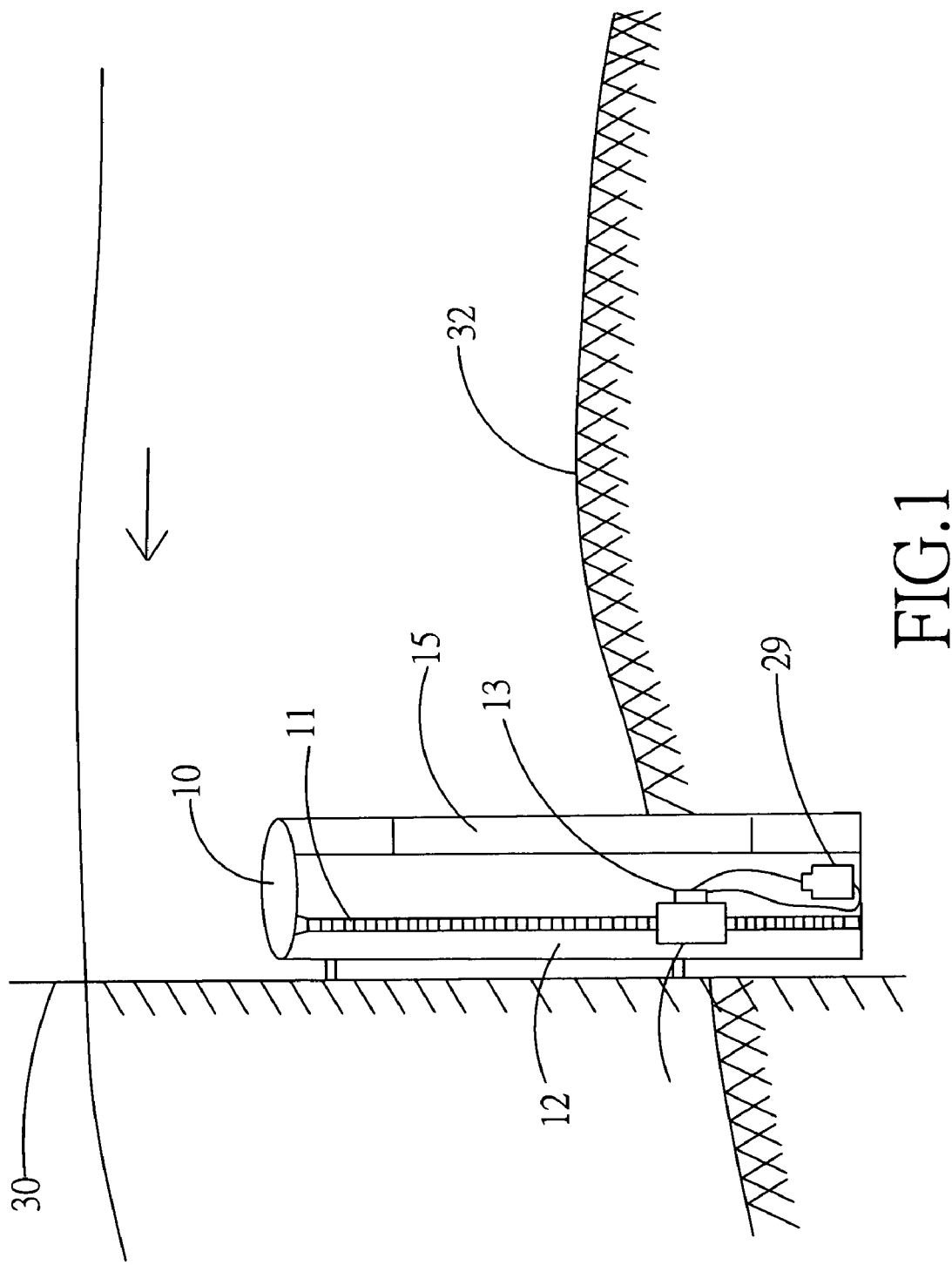
FIG. 1 is a schematic drawing showing an embodiment of the present invention disposed at a bridge pier.

Refer to FIG. 1, a monitor system for monitoring riverbed elevation changes at bridge piers includes a container (receiving portion) 10 that is disposed on a pier by a certain way. The container 10 is made of waterproof material with impact resistance such as steel to prevent water from flowing into the container 10 and avoid damages caused by impact for protecting a device or a system mounted therein. In an embodiment, the container 10 is a hollow cylindrical tube with a streamlined appearance so as to reduce influence on the flow field. A rail 11 is arranged in the container 10 and a holder 12 is disposed on and is moved along with the rail. In a preferred embodiment of the present invention, the holder 12 is a working cart. A photographic unit 13 is arranged at the holder 12 to capture a monitor image of a riverbed 32 under the water. In a preferred embodiment of the present invention, the photographic unit 13 is a Charge Coupled Device (CCD) or other photography apparatus. On the side facing a water flow, the container 10 is disposed with a transparent window 15 so as to allow the photographic unit 13 taking images of the riverbed 32 under the water through the transparent window 15.

Figure 2:
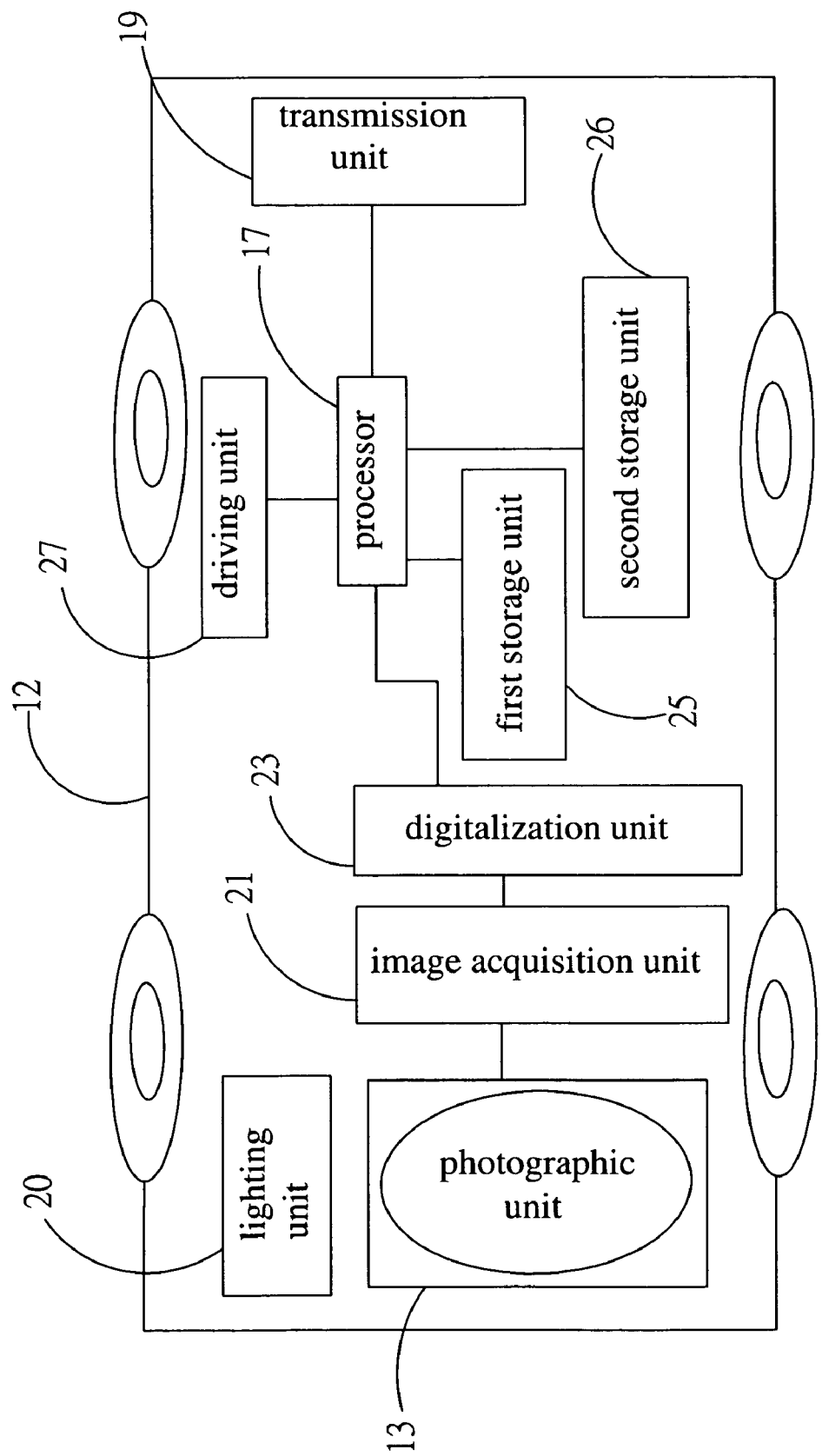
FIG. 2 is a block diagram of an embodiment according to the present invention.

Refer to FIG. 2, a block diagram of an embodiment according to the present invention shows that the holder 12 is further arranged with a processor 17 that processes the monitor images captured by the photographic unit 13 so as to learn the changes in the riverbed 32 elevations under the water. By a transmission unit 19 coupled with the processor 17, the riverbed 32 elevation changes are sent to a remote monitor unit 40 (shown in FIG. 4). Thus people monitoring the riverbed can learn the riverbed 32 elevation changes and record the related data in the remote monitor unit 40. How the processor 17 of the embodiment processes the monitor images to obtain the riverbed 32 elevation changes is going to be described in details later. In a preferred embodiment of the present invention, the transmission unit 19 can be a wireless transmission unit or a wired transmission unit. Moreover, the remote monitor unit 40 also includes a transmission unit (not shown in figures) so as to receive the monitor images transmitted from the transmission unit 19 of the container 10. The remote monitor unit 40 of the present invention can be a computer or other electronic devices such as a personal digital assistant (PDA).

Still refer to FIG. 2, the monitor system of the present invention further includes a lighting unit 20, an image acquisition unit 21 and a digitalization unit 23, all disposed on the holder 12. The lighting unit 20 provides the photographic unit 13 sufficient light for shooting. In a preferred embodiment, the lighting unit 20 is a light emitting diode (LED) light. The image acquisition unit 21 is coupled with the photographic unit 13 so as to take the monitor images captured by the photographic unit 13 and transmit them to the digitalization unit 23 to be digitalized. Then the digitalized images are sent to the processor 17 to be processed for getting elevation changes of the riverbed 32 under the water. Moreover, the processor 17 is further coupled with a first storage unit 25 and a second storage unit 26. The first storage unit 25 is used to store a system software for the processor 17 to execute corresponding events such as analysis of the monitor images so as to learn the riverbed 32 elevation changes while the second storage unit 26 is for storing the monitor images to be processed by the processor 17 and related information after analysis. In a preferred embodiment of the present invention, the first storage unit 25 is a flash memory and the second storage unit 26 is a dynamic random access memory (DRAM).

Moreover, the monitor system of the present invention further includes a driving unit 27 that drives the holder 12 to move along the rail 11 for adjusting positions of the photographic unit 13. The processor 17 is coupled with the driving unit 27 to control action of the driving unit 27 for further control of the movement of the holder 12 on the rail 11. According to the elevation changes of the riverbed 32, the processor 17 works for control of the driving unit 27 so as to drive the holder 12 moving along the rail 11 for shifting the photographic unit 13 to a proper position. In a preferred embodiment of the present invention, the driving unit 27 is a motor. Furthermore, as shown in FIG. 1, the monitor system further consists of a power supply unit 29 that provides power to the system components such as the photographic unit 13, the processor 17, and the transmission unit 19, the lighting unit 20, the driving unit 27, etc. In a preferred embodiment of the present invention, the power supply unit 29 can be a battery or a solar cell.

The way of the power supply unit 29 to supply power can be in a continuous manner or at a fixed-interval. The fixed-interval is set by a circuit that controls the power supply period of the power supply unit 29 to part of components yet the power supplied to the processor 17 is maintained for continuing operation of the monitoring system. Or the processor 17 can periodically turn off part of the components that need power supply. For example the photographic unit 13, the transmission unit 19, and the lighting unit 20 are controlled to be turn on at a 30-sec or 1-min interval so as to monitor the riverbed 32 elevation changes while the rest of time are turned off. Thus the power is saved significantly and the power supply period of the power supply unit 29 is increased. If the power supply unit 29 is used to provide power continuously-that means 24 hours all the time for full-time monitoring of the riverbed 32 elevation changes, the power supply unit 29 can be a solar cell.

Figure 3A:
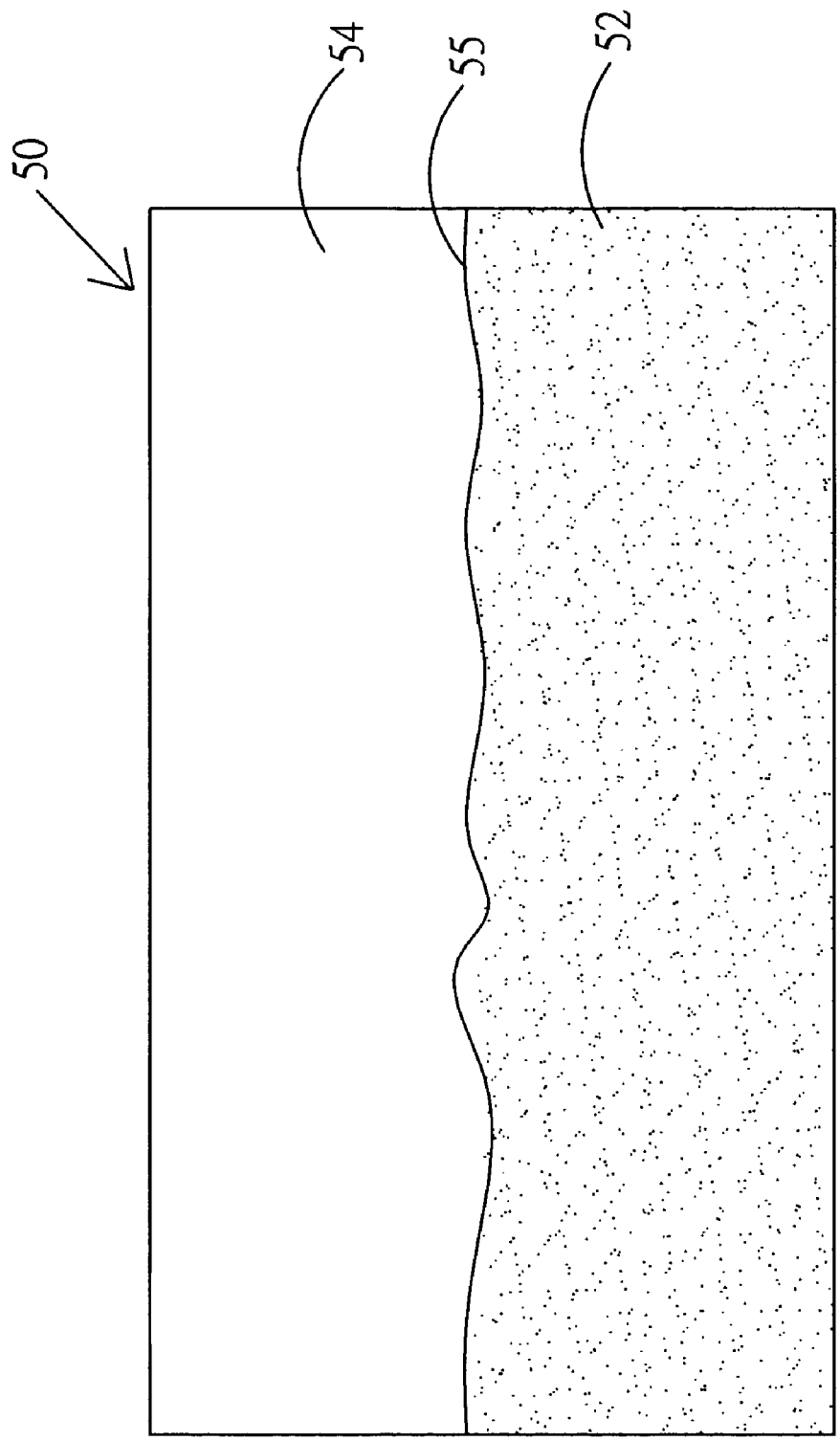
FIG. 3A to FIG. 3C are schematic drawings showing how an embodiment of the present invention capture images.

Refer from FIG. 3A to FIG. 3C, how the processor 17 of the present invention processes the monitor images to learn the elevation changes of the riverbed 32 under the water is explained in the following embodiment. The image shown in FIG. 3A is an initial image 50 that the photographic unit 13 shot the riverbed 32 under the water. The initial image 50 includes a riverbed image 52 and a water image 54. The riverbed image 52 shows sediment deposition in the riverbed 52 and an interface between the riverbed image 52 and the water image 54 is a scour line 55. After being processed by the image acquisition unit 21 and the digitalization unit 23, the initial image 50 is sent to the processor 17. The processor 17 processes the initial image 50 so as to learn the position of the riverbed 52 in the initial image 50 as well as the position of the scour line 55 in the initial image 50. In this embodiment, the area of the riverbed image 52 occupies about a half of that of the initial image 50. That means the scour line 55 is located at about a horizontal center line of the initial image 50. This position is used as a base level.

Figure 3B:
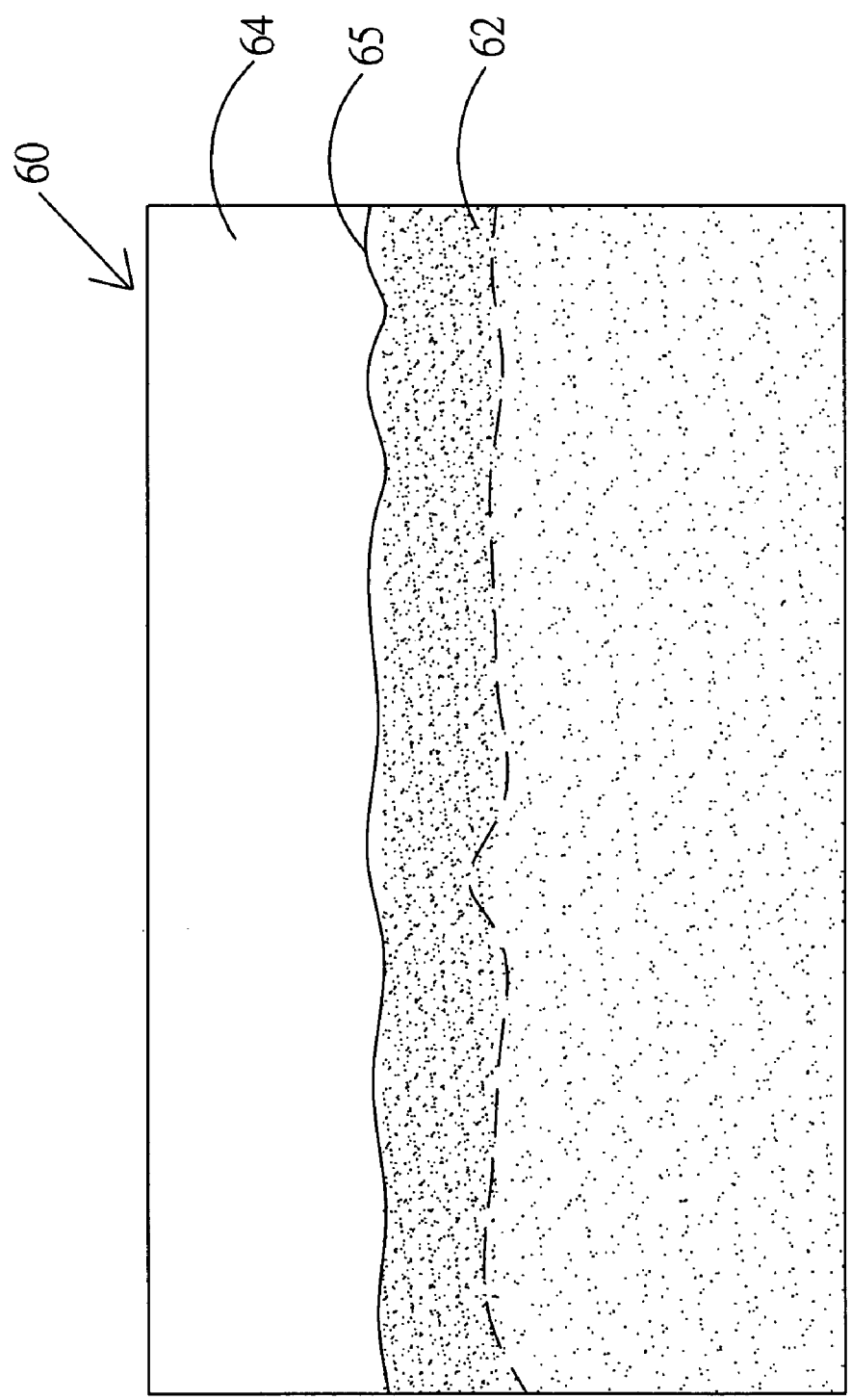
Figure 3C:
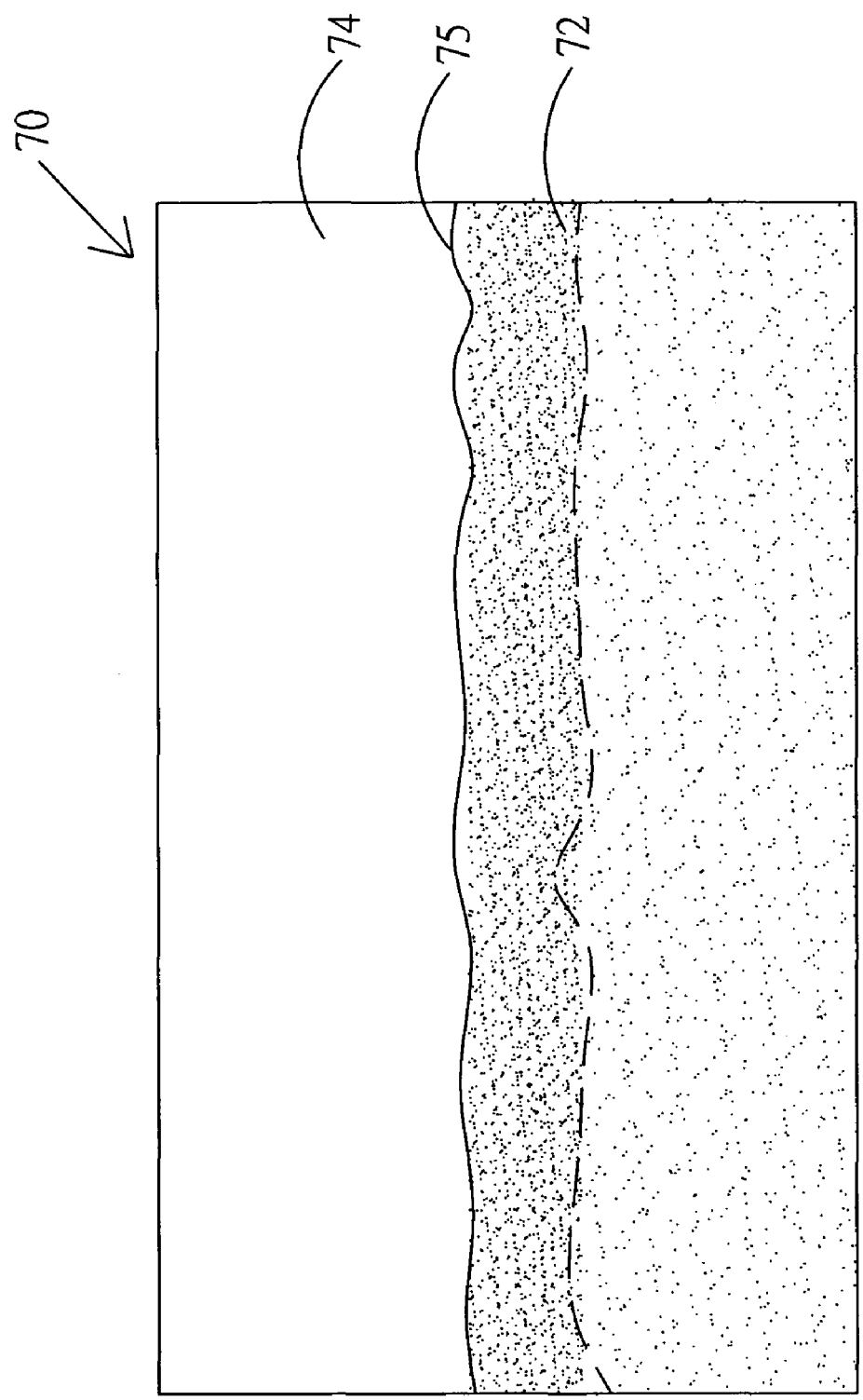

Refer to FIG. 3B, without change of the position, the photographic unit 13 keeps capturing image of the riverbed 32 under the water and gets this monitor image 60. The image acquisition unit 21 and the digitalization unit 23 process the monitor image 60 and then the processed monitor image 60 is sent to the processor 17. The processor 17 processes the monitor image 60 to learn the position of a riverbed image 62 in the monitor image 60 and get the position of a scour line 65 (between the riverbed image 62 and a water image 64) in the monitor image 60. According to the position of the base level and the position of the riverbed image 62 in the monitor image 60, the processor 17 obtains the riverbed 32 elevation change under the water. In this embodiment, the area of the riverbed image 62 occupies about two-thirds of the area of the monitor image 60. Compared with the riverbed image 52 in the initial image 50, the elevation of the riverbed 32 is increased due to silt and sand sediments. Thus the processor 17 gets the elevation change of the riverbed 32 according to the difference between the positions of the two riverbed images 52, 62.

Figure 4:
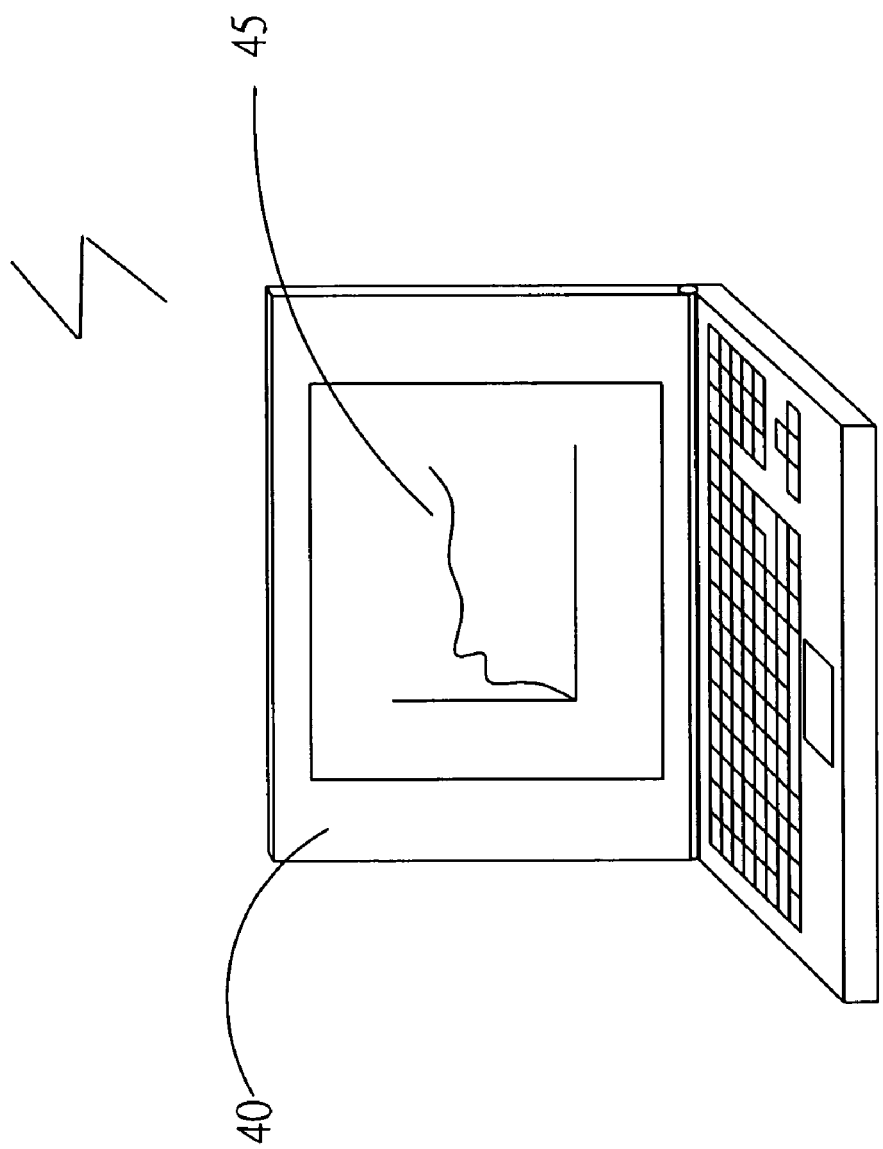
FIG. 4 is schematic drawing showing a remote monitor of an embodiment according to the present invention.

According to the difference between the position of the riverbed image 62 in the monitor image 60 and the base level, the processor 17 controls the holder 12 to move upward along the rail 11 for adjusting the photographic unit 13 and taking an image of the riverbed 32 again so as to make the position of a riverbed image 72 in a monitor image 70 equal to the base level. That means the height of the riverbed image 72 is about a half of the height of the monitor image 70. Moreover, the processor 17 sends the distance and the direction of the movement of the holder 12 to the remote monitor unit 40 by the transmission unit 19. This means sending the difference between the position of the riverbed image 62 in the monitor image 60 and the base level, which represents the riverbed 32 elevation change. Thus the staffs responsible for monitoring can learn the riverbed 32 elevation changes according to the data received by the remote monitor unit 40. Moreover, the depth of the riverbed 32 is measured in advance and then is calculated together with the obtained riverbed 32 elevation change so as to get the depth of the riverbed 32 at this moment. As to the remote monitor unit 40, it records all the data received to build up a database for reference purposes. As shown in FIG. 4, a curve showing elevation changes is displayed on the remote monitor unit 40.

Back to FIG. 3A, the present invention can adjust positions of the photographic unit 13 so as to make the riverbed image 52 of the initial image 50 locate at a preset position of the base level before starting monitoring. In this embodiment, the height of the base level is at about a half of the height of the initial image. But this is only an embodiment, the base level is not limited to this position. When the monitor system of the present invention starts working, an initialization process is performed. The processor 17 controls the driving unit 27 to move the holder 12 to a proper position and allow the photographic unit 13 shooting the riverbed 32 under the water to get an unadjusted initial image. After being processed by the image acquisition unit 21 and the digitalization unit 23, the image is sent to the processor 17 for analysis so as to learn where a riverbed image is located in the unadjusted initial image. According to the difference between the preset base level and position of the riverbed in the unadjusted initial image, the processor 17 controls the movement of the holder 12 through the driving unit 27 so as to adjust image-taking positions of the photographic unit 13. Then the photographic unit 13 takes images of the riverbed 32 again so as to get an adjusted initial image 50 (refer to FIG. 3A). The height of the riverbed image 52 in the adjusted initial image 50 is around a half of the height of the initial image 50, equal to the preset base level.

The difference between the monitor system of the present invention and conventional techniques is in that: the elevation changes of the riverbed 32 are obtained directly according to the analysis results of the images captured by the photographic unit 13 and processed by the processor 17 in the present invention. Then the analysis results are transmitted to the remote monitor unit 40. Thus there is no need to transmit the images with large data amount and the bandwidth consumption is reduced effectively. Moreover, the processor 17 of the present invention can control the movement of the holder 12 directly according to the elevation changes of the riverbed 32 so as to further adjust shooting positions of the photographic unit 13. Thus staffs responsible for monitoring don't need to monitor the elevation changes of the riverbed 32 all the time for adjusting photographing positions. Therefore, the manpower requirement is minimized and the convenience of monitoring is increased.

In summary, a monitor system for monitoring riverbed elevation changes at bridge piers according to the present invention includes a rail, a holder, a photographic unit, a processor and a transmission unit, all mounted in a container. The monitor system is disposed at a bridge pier. The processor processes monitor images of the riverbed under the water captured by the photographic unit so as to learn the riverbed elevation changes. The related data is sent to a remote monitor unit by the transmission unit. Thus the riverbed elevation changes are monitored and recorded in a real-time way. In the present invention, instead of the monitor images, the riverbed elevation changes are sent to the remote monitor unit so that the amount of data transmission is reduced dramatically and the bandwidth consumption is minimized effectively. Moreover, according to the riverbed elevation changes, the processor automatically controls the holder moving on the rail so as to adjust positions of the photographic unit along with the scour and deposition of the riverbed for capturing the monitor images automatically and accurately. This requires no labor for remote control of the holder in real-time to adjust the photographic unit. Therefore, the present invention reduces labor cost dramatically and improves the convenience of monitoring riverbed elevation changes at bridge piers.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A monitor system for monitoring riverbed elevation changes at bridge piers comprising:
 a container disposed on a bridge pier,
 a linear rail mounted longitudinally in the container,
 a holder arranged at the rail and moving vertically along the rail to selectively adjust an elevation thereof,
 a photographic unit arranged at the holder for capturing at least one monitor image of a riverbed under the water,
 a processor that processes the monitor image so as to learn an elevation change of the riverbed, and
 a transmission unit coupled with the processor for sending the elevation changes to a remote monitor unit.

2. The device as claimed in claim 1, wherein the container is disposed with a transparent window so as to allow the photographic unit taking the monitor image through the transparent window.

3. The device as claimed in claim 1, wherein the container is closed.

4. The device as claimed in claim 1, wherein the container is made of waterproof material.

5. The device as claimed in claim 4, wherein the waterproof material is steel.

6. The device as claimed in claim 1, wherein the monitor system having an image acquisition unit that takes the monitor image of the riverbed under the water captured by the photographic unit.

7. The device as claimed in claim 6, wherein the monitor system includes a digitalization unit that digitalizes the monitor image taken by the image acquisition unit.

8. The device as claimed in claim 1, wherein the processor controls the movement of the holder on the rail according to the elevation change of the riverbed.

9. The device as claimed in claim 1, wherein the photographic unit captures an initial image while the initial image and the monitor image respectively include a riverbed image; the processor processes the initial image and the monitor image to learn a position of the riverbed image in the initial image and in the monitor image and further get the elevation change of the riverbed according to a difference between the position of the riverbed image in the initial image and the position of the riverbed image in the monitor image.

10. The device as claimed in claim 9, wherein the processor controls the holder to move on the rail according to the elevation change of the riverbed.

11. The device as claimed in claim 1, wherein the processor goes through an initialization process; the photographic unit shoots the riverbed under the water to get an initial image having a riverbed image and according to a base level and the position of the riverbed image in the initial image, the processor controls the holder to move for adjusting the position of the riverbed image in the initial image equal to the base level.

12. The device as claimed in claim 11, wherein the base level is at a horizontal center line of the initial image.

13. The device as claimed in claim 11, wherein the processor processes the monitor image to get a position of a riverbed image in the monitor image and obtain the elevation change of the riverbed according to a difference between the position of the riverbed image in the monitor image and the base level.

14. The device as claimed in claim 13, wherein the processor controls the holder to move on the rail according to the elevation change of the riverbed for adjusting the position of the riverbed image in the monitor image equal to the base level.

15. The device as claimed in claim 1, wherein the monitor system includes a storage unit coupled with the processor and storing a system software that is executed by the processor.

16. The device as claimed in claim 15, wherein the storage unit is a flash memory.

17. The device as claimed in claim 1, wherein the monitor system includes a storage unit for storage of the monitor image.

18. The device as claimed in claim 17, wherein the storage unit is a dynamic random access memory (DRAM).

19. The device as claimed in claim 1, wherein the transmission unit is a wireless transmission unit.

20. The device as claimed in claim 1, wherein the transmission unit is a wired transmission unit.

21. The device as claimed in claim 1, wherein a lighting unit is disposed on the holder.

22. The device as claimed in claim 21, wherein the lighting unit is a light emitting diode (LED) light.

23. The device as claimed in claim 1, wherein the monitor system includes a driving unit that is coupled with the processor and is for driving the holder to move on the rail; the processor controls the driving unit for further control of the movement of the holder.

24. The device as claimed in claim 23, wherein the driving unit is a motor.

25. The device as claimed in claim 1, wherein the monitor system includes a power supply unit that provides power to the photographic unit, the processor, and the transmission unit.

26. The device as claimed in claim 25, wherein the power supply unit is a battery.

27. The device as claimed in claim 1, wherein the holder is a working cart.

28. The device as claimed in claim 1, wherein the remote monitor unit is a computer.

* * * * *